(12) United States Patent
Fallen

(10) Patent No.: US 7,784,863 B2
(45) Date of Patent: Aug. 31, 2010

(54) VEHICLE SEAT

(76) Inventor: Manfred Fallen, Unterer Wingertsberg 6, Otterberg (DE) 67697

( * ) Notice: Subject to any disclaimer, the term of this patent is extended or adjusted under 35 U.S.C. 154(b) by 0 days.

(21) Appl. No.: 12/324,266

(22) Filed: Nov. 26, 2008

(65) Prior Publication Data

US 2009/0140558 A1    Jun. 4, 2009

(30) Foreign Application Priority Data

Dec. 4, 2007 (EP) .................................. 07023466

(51) Int. Cl.
A47C 7/74 (2006.01)
(52) U.S. Cl. .................. 297/180.14; 297/180.1; 297/180.12; 297/180.13
(58) Field of Classification Search ............. 297/180.1, 297/180.12, 180.13, 180.14
See application file for complete search history.

(56) References Cited

U.S. PATENT DOCUMENTS

| | | | | |
|---|---|---|---|---|
| 4,572,430 A * | 2/1986 | Takagi et al. ................. 237/2 A |
| 5,002,336 A * | 3/1991 | Feher .................... 297/180.13 |
| 5,102,189 A * | 4/1992 | Saito et al. ............. 297/180.14 |
| 5,137,326 A * | 8/1992 | George ........................ 296/208 |
| 6,027,807 A * | 2/2000 | Inoue et al. ......... 297/180.12 X |
| 6,321,996 B1 * | 11/2001 | Odebrecht et al. ...... 237/12.3 A |
| 6,604,785 B2 * | 8/2003 | Bargheer et al. ....... 297/180.14 |
| 6,644,735 B2 * | 11/2003 | Bargheer et al. ....... 297/180.13 |
| 6,746,076 B2 * | 6/2004 | Bogisch et al. ........ 297/180.14 |
| 6,761,399 B2 * | 7/2004 | Bargheer et al. ....... 297/180.12 |
| 6,786,545 B2 * | 9/2004 | Bargheer et al. ......... 297/217.1 |
| 7,452,028 B2 * | 11/2008 | Knoll et al. ............... 297/180.1 |
| 7,503,625 B2 * | 3/2009 | Bargheer et al. ....... 297/180.14 |
| 7,581,785 B2 * | 9/2009 | Heckmann et al. ..... 297/180.14 |
| 7,621,594 B2 * | 11/2009 | Hartmann et al. ...... 297/180.12 |
| 2002/0041116 A1 * | 4/2002 | Bogisch et al. ........... 297/180.1 |
| 2002/0057006 A1 * | 5/2002 | Bargheer et al. ....... 297/180.14 |
| 2003/0132650 A1 * | 7/2003 | Bargheer et al. ....... 297/180.13 |
| 2006/0175877 A1 * | 8/2006 | Alionte et al. ......... 297/180.14 |
| 2008/0036249 A1 * | 2/2008 | Heckmann et al. ..... 297/180.13 |
| 2008/0290703 A1 * | 11/2008 | Bargheer et al. ....... 297/180.14 |
| 2008/0315634 A1 * | 12/2008 | Hartmann et al. ...... 297/180.14 |
| 2009/0134677 A1 * | 5/2009 | Maly et al. ............. 297/180.14 |
| 2009/0140558 A1 * | 6/2009 | Fallen ...................... 297/180.1 |

FOREIGN PATENT DOCUMENTS

| | | |
|---|---|---|
| DE | 100 47 754 | 4/2002 |
| DE | 10 2004 002 074 | 4/2005 |
| JP | 04 158807 | 6/1992 |
| WO | WO 2007/012470 | 2/2007 |

* cited by examiner

*Primary Examiner*—Rodney B White
(74) *Attorney, Agent, or Firm*—Doyle Fredrickson, S.C.

(57) ABSTRACT

A vehicle seat has a back rest, a head restraint, which is adjustable in the height and which has a head cushion, and a ventilation device, whose exhaust vent for blowing out a warm airflow is arranged on the upper side of the back rest. The vehicle seat that has a construction that is simplified and aesthetically pleasing and that is characterized in that a diverting mechanism is provided in a lower area of the head restraint and is integrated into the head cushion. The warm airflow issuing from the exhaust vent is diverted into the head and/or neck area of a seat passenger via this diverting mechanism.

21 Claims, 2 Drawing Sheets

VEHICLE SEAT

BACKGROUND OF THE INVENTION

1. Field of the Invention

The present invention relates to a vehicle seat with a back rest, a head restraint, which is adjustable in the height and which has a head cushion, and a ventilation device, whose exhaust vent for blowing out a warm airflow is arranged on the upper side of the back rest.

2. Description of the Related Art

Such a generic vehicle seat serves, particularly in the case of a convertible, the circulation in the neck area of a vehicle passenger, especially when the roof is open, in order to compensate for the draught. A generic vehicle seat is known, for example, from DE 10 2004 002 074 83. In this state of the art, a textile membrane extends between the upper side of the back rest and the head cushion, whereby this textile membrane covers the interspace provided in between and works as a diffuser, so that the warm airflow that issues from the back rest at the upper side of the back rest between the textile covering and the vehicle passenger is diverted in the direction of the vehicle passenger. On the side of the back rest, the textile covering is wound around via a winding mechanism, so that an adjustment of the textile covering to various positions of the head restraint relative to the back rest is possible. As is generally known, the position of the head restraint must be individually adjusted to the size of the vehicle passenger in order to protect the vehicle passenger in the event of an accident.

The aforementioned solution is relatively complex and furthermore unsightly, because it is not always possible to stretch the textile covering in such a way that there are no wrinkles. In addition, the dimensions of the covering must be adjusted to the position of supporting bars that support the head restraint and that are held in the back rest in such a way as to be displaceable.

In an alternative development known from DE 10047754, a multitude of air outlet openings are provided in the upper area of the back rest which surrounds the shoulder area, whereby these air outlet openings are intended to bring about a uniform air cushion in the shoulder and neck area of a passenger, namely on the basis of an airflow that is drawn in from the back side of the vehicle seat and pressed out forward through the cushion and covering of the back rest. This development requires uniform perforation of the upper area of the back rest, which leads to limitations with regard to the eligibility of suitable covers for the cushion of the back rest. In an alternative development, an air distribution device is integrated into the back rest, whereby this air distribution device is intended to deliver air to the shoulder, neck and head area of the passenger via various exhaust openings. This development is also relatively complex. In addition, the various exhaust openings should be avoided in the vehicle seat for aesthetic reasons. Furthermore, the known solution does not allow for a neck flow that is adapted to the individual size of the vehicle passenger. The neck is, however, the most sensitive part of humans, particularly as regards unpleasant draught currents.

In a further development known from DE 100 54 010, an exhaust pipe, the height of which can be adjusted, is attached to the back rest, whereby the exhaust vent of this exhaust pipe is integrated into the head restraint and this exhaust vent can be adjusted in the height along with the head restraint. In conventional vehicle seats, in which the head restraint is arranged so as to be elevated above the back rest, such a development leads to an unsightly development with a pipe piece between the upper side of the back rest and the head restraint. Furthermore, special measures, which make the design complex and expensive, must be taken in order to use pipes to form an airway that is airtight and that can be adjusted in the height.

OBJECT OF THE INVENTION

The object of the present invention is to provide a vehicle seat of the type mentioned at the beginning which allows circulation in the head, neck and shoulder area of the vehicle passenger and that satisfies the higher aesthetic requirements while being simple to manufacture.

To solve this problem, the present invention proposes a vehicle with a back rest, a head restraint which is adjustable in height and which has a head cushion, and a ventilation device whose exhaust vent is arranged for venting a warm airflow at the upper side of the back rest. A diverting mechanism is provided in a lower area of the head restraint and integrated into the head cushion. The diverting mechanism is arranged such that warm airflow issuing from the exhaust vent can be diverted into the head and a neck area of a seat passenger by means of this diverting mechanism. To be understood as a diverting mechanism is any structure that is formed, especially on the underside of the head restraint, opposite the back rest, namely in a special geometric shape that allows a selective diversion of the airflow to the head and/or neck area of the vehicle passenger.

The diverting surface of the diverting mechanism provided for this is preferably formed by an injection moulding part, particularly preferably in the form of a plastic shell, which is attached to the head cushion, namely preferably by mechanism of being clipped into place. This development allows the diverting surface to be shaped for the best possible diversion of the warm airflow to the neck and/or head area of the vehicle passenger. Concave and/or convex developments are consequently possible. In the case of a relatively bundled warm airflow flowing out of the upper area of the back rest, this warm airflow can be diverted and emitted in a comparatively diffuse manner in the direction of the head and/or neck area by means of the diverting mechanism. For this purpose, the diverting mechanism can particularly have a rough surface structure which breaks the relatively bundled warm airflow and softly diverts it to the neck and/or head area of the vehicle passenger.

In contrast to the known state of the art, in the solution concept according to the invention an airway is used between the upper side of the back rest and the underside of the head restraint in order for the airflow to stream preferably strongly bundled, first against the underside of the head restraint and there especially against the diverting mechanism. It is not until after the diverting mechanism that the warm airflow is fanned out and homogenized in such a way that circulation that is pleasant for the vehicle passenger is achieved in the head and neck area.

With a view to an arrangement that is as attractive as possible, it is furthermore to be preferred for the diverting mechanism to be integrated into the head cushion in such a way that the diverting mechanism is provided within a covering surface of the head cushion. Authoritative for this point of view is particularly a cross-sectional view through the head restraint, whereby the covering surface of the head cushion is formed by the outer peripheral area of the head restraint. The development does not exclude that a shell, particularly one forming the diverting means, extends up to the covering surface of the head restraint. The diverting surface, however, is located exclusively or almost exclusively offset inwards, relative to the covering surface, i.e., within the uninterrupted contour of the head cushion. The further development presented before leads to an essentially uninterrupted appearance in a head restraint. This can be formed solely with creative points of view being considered. The diverting mechanism lies within the covering surface and so is initially concealed from the observer, which allows an aesthetic arrangement of the head restraint.

The conductance of warm air via an airway fundamentally allows the head restraint to be displaced in any way and allows an arrangement of the same relative to the upper side of the back rest. Sometimes, however, in the case of relatively small vehicle passengers, it is necessary to place the head restraint directly on the upper side of the back rest. A preferred further development of the present invention takes this circumstance into account in that the diverting mechanism lies opposite an opening cross-section of the exhaust vent that lies in the upper surface of the back rest and in that the diverting mechanism has an area that covers the opening cross-section, whereby this area is provided to divert the emitted airflow. To be understood as the diverting mechanism lying opposite the exhaust vent here is such a diverting mechanism that is acted upon by the warm airflow at any given elevation of the head restraint relative to the back rest and that in a lowest position, in which the head restraint is virtually or completely sitting on the upper side of the back rest, is provided as an extension of an air channel which leads to the exhaust vent and which is integrated into the back rest.

For the best possible directing of the airflow and distribution via the diverting mechanism and particularly with a view to pleasant circulation in the head and neck area in the aforementioned lowest position of the head restraint, a further preferred development of the present invention proposes that the exhaust vent be provided with an air channeling element on its border strip close to the backside of the back rest, whereby this air channeling element juts out from the upper side of the back rest and is directed toward the front side of the back rest. The last partial section of a channel for conducting warm air within the back rest outward to the exhaust vent is elongated by this air channeling element. Furthermore, the air channeling element brings about a slight orientation of the airflow away from the orientation which is, as a rule, initially strictly vertical, or possibly even slightly tilted backward, into an orientation that leads to the vehicle passenger, meaning an orientation that is tilted forward. The aforementioned air channeling element is, as a rule, formed by mechanism of injection moulding as a single piece as a part of the channel that conducts the warm air in the back rest, and normally protrudes from a flange, which also lies on the back rest for the purpose of fastening the channel to the upper side of the back rest and is connected to the channel. The channel can naturally be formed as a number of pieces in the back rest.

The aforementioned air channeling element preferably acts together with the diverting mechanism in the aforementioned lowest position of the head restraint, in which the head restraint virtually or completely lies on the upper side of the back rest, in such a way that the exhaust vent provided on the upper side of the back rest is displaced to the front side of the back rest. This displaced exhaust vent is formed by the front side of the back rest and an edge that borders the front side of the diverting mechanism and the underside of the head cushion. This edge is preferably formed by the diverting mechanism itself, stretching essentially horizontally up to the lateral edges of the air channeling element, and is pulled from there downward toward the back rest, in order laterally to hold the air channeling element and the exhaust vent formed on the upper side of the back rest. In the front view of the head restraint, the diverting mechanism accordingly preferably has a U-shaped form and is preferably located between the supporting bars of the head restraint.

Further details and advantages of the present invention can be taken from the following description of an embodiment, in conjunction with the drawing. This drawing shows:

DETAILED DESCRIPTION OF THE PREFERRED EMBODIMENTS

Figure 1:
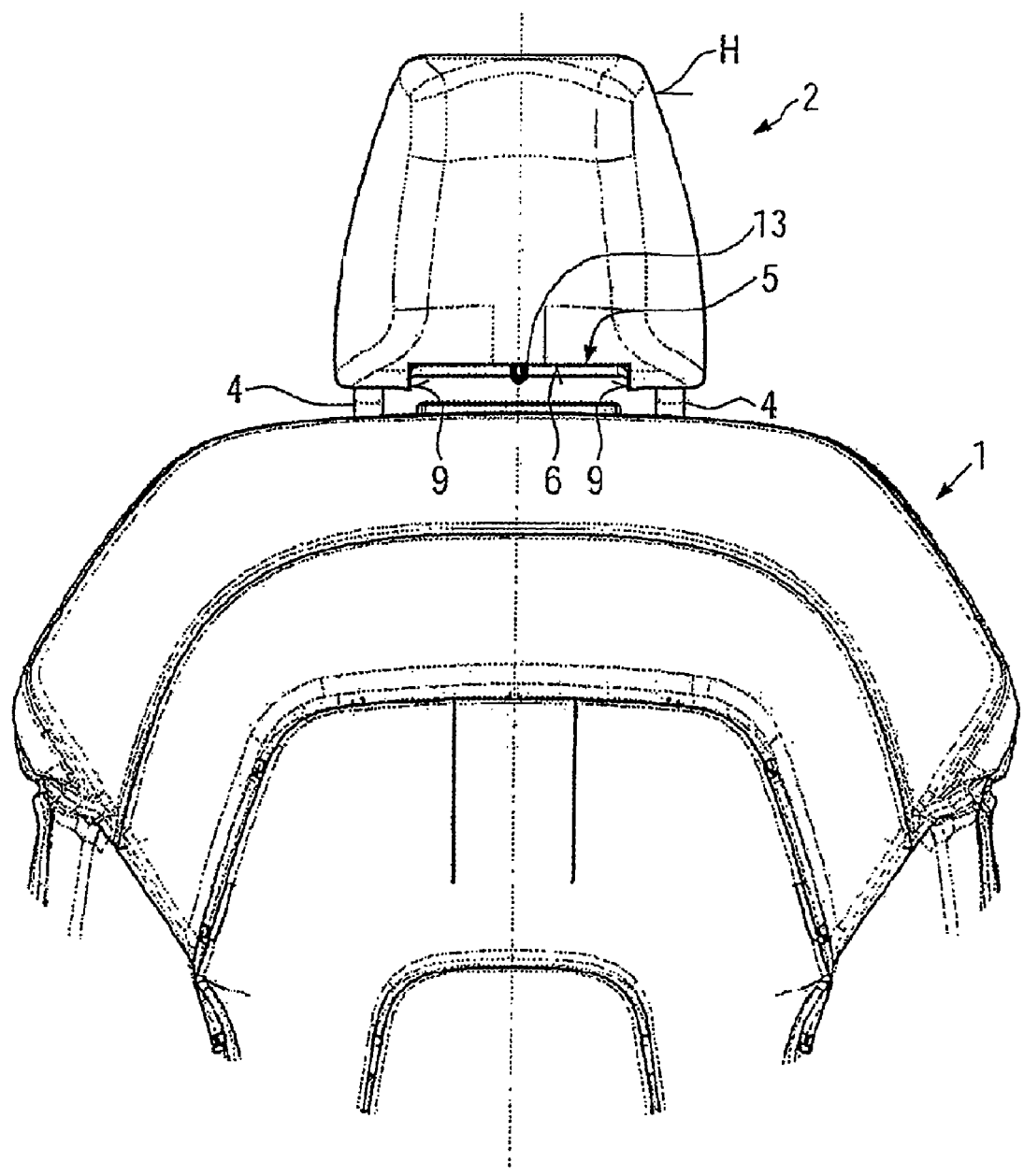
FIG. 1 a front view on to an embodiment.

FIG. 1 shows the upper part of a back rest 1 of a vehicle seat, whose further parts are not of concern for the explanation of the invention. The back rest supports a head restraint 2 with a head cushion 3 that softly surrounds this head restraint. The head restraint 2 is mounted in such a way that its height can be adjusted relative to the back rest 1 via supporting bars 4, whereby the supporting bars 4 are held in a holder in the back rest 1 in a known way that allows them to be displaced.

On the part of the head restraint 2, between the supporting bars 4, is a diverting mechanism 5 which, in the case of the embodiment shown, is formed by an injection moulded plastic shell, whereby the outward pointing area of this forms a diverting surface 6 which is formed so that it is essentially concave and offset inward relative to a covering surface that surrounds the head cushion 3, so that it is provided integrated into the head cushion. This arrangement is particularly clear in the side view shown in FIG. 3. It can be seen that the diverting surface 6 is provided within the covering surface identified in FIG. 3 with the capital letter H, i.e., it is arranged so that it is offset inward (up) with respect to the covering surface H. The diverting mechanism 5 has a front edge 7 that borders the diverting mechanism 5 in the direction of the vehicle passenger and that merges into the covering surface H of the head cushion 3 without an offset. The other end of the diverting mechanism 5 in the sectional view (cf. FIG. 3) is given by a rear edge 8, which is located on the underside of the head cushion 3. The rear edge 8 also merges into the covering surface H in a flush manner. The rear edge 8 is located roughly in the last quarter of the head restraint (2) in its thickness direction (or namely in the direction of travel). The supporting bars 4 connect to the head restraint 2 roughly at the level of the rear edge 2. In the side-view (ct. FIG. 1), the diverting mechanism 5 forms side walls 9 that laterally border the diverting surface 6, whereby these side walls extend roughly in the vertical direction and are bordered on the outside by the cushioning of the head restraint 2.

It follows that the plastic shell forming the diverting mechanism 5 connects to the covering surface H of the head cushion 3 without an offset and is located between the two supporting bars 4.

Figure 3:
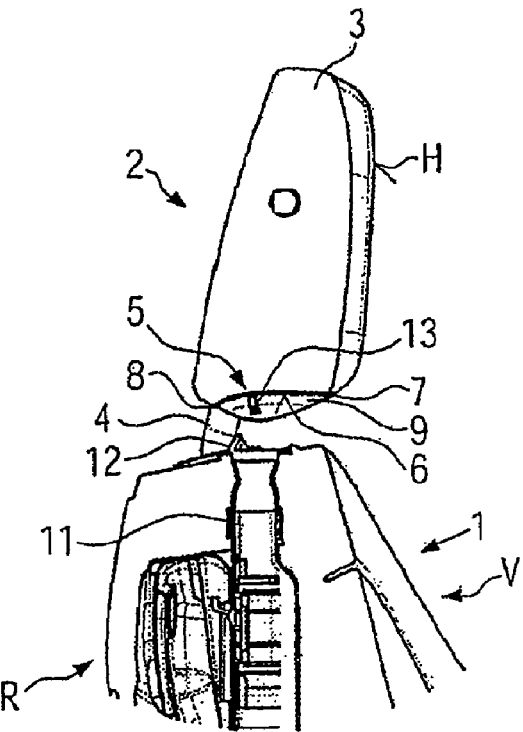
FIG. 3 a longitudinal view of the embodiment shown in FIGS. 1 and 2.

In the case of the embodiment shown in the drawing, the diverting surface 6 has a concave shape when seen in the sectional view as shown in FIG. 3, whereas it is essentially flat in the side view. But the diverting surface 6 can be formed so that it is concave or concave in sections, even in the side view, in order, for example, to emit two separated partial air streams forward.

An exhaust vent 10 of a warm air channel 11 is provided directly opposite the diverting surface 6 for this purpose, whereby this warm air channel 11 is arranged essentially within the back rest 1, namely centered between the front and back side V; R, and is part of a warm air module, which comprises an auxiliary heater, which is not shown here, and a fan, likewise not shown. The exhaust vent 10 lies opposite the diverting mechanism 5. The exhaust vent 10 and the diverting surface 6 are accordingly located in a plane that is parallel to the displacement direction of the supporting bars 4. The exhaust vent 10 is bordered on the back by an air channeling element 12, which juts out from the upper side of the back rest 1 and which is tilted diagonally forward toward the front side V of the back rest 1. This air channeling element 12 has lateral side walls 13, which are formed essentially as triangles and which extend between the upper side of the back rest 1 and the essentially level air channeling element 12. The distance between the opposing side walls 13 is a little less than the corresponding distance between the side walls 9. The exhaust vent 10 points forward at a slight tilt due to the development of the air channeling element. The exhaust vent 10 extends here between the front edge of the warm air channel 11 and the front edge of the air channeling element 12 in the side view on the one hand and between the two side walls 13 in the front view on the other hand.

In a lowest position of the head restraint 2, in which this is maximally lowered toward the back rest 1 so that it lies, with its cushion 3, on the upper side of the back rest 1, the diverting surface 6 covers the exhaust vent 10, whereby the side walls 9 of the diverting surface 6 surround the assigned side walls 13 on the outside. In this lowest position there results an exhaust vent that is displaced toward the front side V and that is located between the front edge 7 and the front side of the back rest 1. In other words, the warm air leaving the warm air channel 11 is first directed between the top of the back rest 1 and the diverting surface 6, where it then issues into an outlet that lies essentially in a vertical plane and that connects the front side V of the back rest with the edge 7 of the diverting surface 6.

Figure 2:
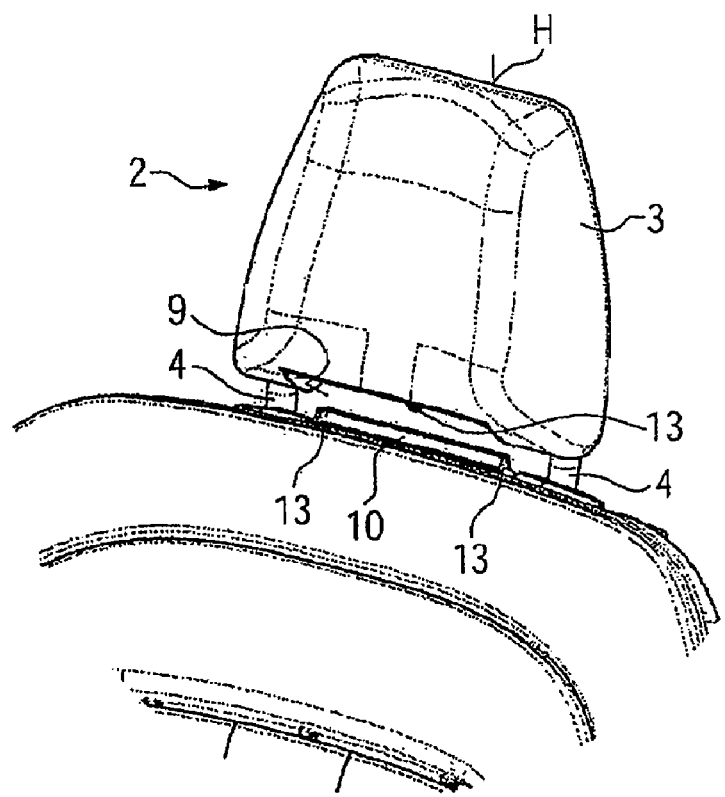
FIG. 2 a perspective side-view of the embodiment set out in FIG. 1.

In the case of the embodiment shown, a sensor 14 is indicated centered in the diverting surface 6 in both the top view as shown in FIG. 2 and in the sectional view as shown in FIG. 3, whereby this sensor 14 serves to regulate the warm air module and register the temperature of the air issuing from the exhaust vent 10. The module can also alternatively be regulated in a known manner by a sensor that is arranged between the exhaust vent 10 and the auxiliary heater and that registers the temperature of the warm air in the warm air channel 11. It is furthermore possible to do without a corresponding sensor and to determine the temperature of the air issuing from the warm air channel 11 indirectly by means of the power consumption and/or the resistance of the auxiliary heater.

The invention claimed is:

1. A vehicle seat comprising:
   a back rest,
   a head restraint which extends from a top portion of the back rest, which is adjustable in height relative to the back rest, and which has a head cushion;
   a ventilation device having an exhaust vent arranged for venting a warm airflow out of an upper side of the back rest to a space between head restraint and the back rest; and
   a diverting mechanism provided in a lower area of the head restraint, wherein the diverting mechanism is attached to but is not part of the head cushion and is made of a different material than the head cushion, wherein the entire diverting mechanism is spaced above the top portion of the back rest and is disposed relative to the exhaust vent such that the warm airflow issuing from the exhaust vent is diverted into at least one of a head and a neck area of a seat passenger via the diverting mechanism.

2. The vehicle seat according to claim 1, wherein the diverting mechanism forms a plastic shell which is attached to the head cushion.

3. The vehicle seat according to claim 1, wherein the diverting mechanism has a surface that is impermeable to air and that diffusely spreads the warm airflow.

4. The vehicle seat according to claim 1, wherein the diverting mechanism has a rough surface structure.

5. The vehicle seat according to claim 1, wherein the diverting mechanism is arranged on the head cushion in such a way that it is offset inward relative to a covering surface of said head cushion.

6. The vehicle seat according to claim 1, wherein the diverting mechanism lies opposite an opening cross-section of the exhaust vent that lies in the upper side of the back rest and has an area that covers the opening cross-section for the purpose of diverting the issued warm airflow.

7. The vehicle seat according to claim 6, wherein the exhaust vent, on a border strip thereof near to a back side of the back rest, has an air channeling element that projects from an upper side of the back rest and that is aimed toward a front side of the back rest.

8. The vehicle seat according to claim 7, wherein the air channeling element extends a wall of an air channel of the ventilation device that ends in the exhaust vent and that runs in the back rest.

9. A vehicle seat comprising:
   a back rest;
   a head restraint which is adjustable in height and which has a head cushion;
   a ventilation device having an exhaust vent arranged for venting a warm airflow at an upper side of the back rest;
   a diverting mechanism provided in a lower area of the head restraint and disposed within the head restraint, wherein the warm airflow issuing from the exhaust vent is diverted into at least one of a head and a neck area of a seat passenger via the diverting mechanism;
   wherein the diverting mechanism lies opposite an opening cross-section of the exhaust vent that lies in the upper side of the back rest and has an area that covers the opening cross-section for the purpose of diverting the issued warm airflow;
   wherein the exhaust vent, on a border strip thereof near to a back side of the back rest, has an air channeling element that projects from an upper side of the back rest and that is aimed toward a front side of the back rest; and
   wherein the air channeling element, in a lowest position of the head restraint, borders on the diverting mechanism in such a way that an edge which borders on a front side of the diverting mechanism and a lower side of the head cushion forms, with a front side of the back rest, the exhaust vent of the ventilation device, the exhaust vent being displaced with respect to the front side of the back rest.

10. The vehicle seat according to claim 9, wherein the diverting mechanism is arranged between supporting bars of said head restraint and forms a U-form that is open toward the back rest in such a way that, in the lowest position of the head restraint, the air channeling element is bordered by the diverting mechanism, and wherein the diverting mechanism is attached to the head cushion by being clipped in place.

11. A vehicle seat comprising:
a back rest;
a head restraint, which is adjustable in height and which has a head cushion;
a ventilation device having an exhaust vent arranged for venting a warm airflow at an upper side of the back rest;
a diverting mechanism provided in a lower area of the head restraint and disposed within the head restraint, wherein the warm airflow issuing from the exhaust vent is diverted into at least one of a head and a neck area of a seat passenger via the diverting mechanism;
wherein the diverting mechanism lies opposite an opening cross-section of the exhaust vent that lies in the upper side of the back rest and has an area that covers the opening cross-section for the purpose of diverting the issued warm airflow;
wherein the exhaust vent, on a border strip thereof near to a back side of the back rest, has an air channeling element that projects from an upper side of the back rest and that is aimed toward a front side of the back rest;
wherein the air channeling element extends a wall of an air channel of the ventilation device that ends in the exhaust vent and that runs in the back rest; and
wherein the air channeling element, in a lowest position of the head restraint, borders on the diverting mechanism in such a way that an edge which borders on a front side of the diverting mechanism and on a lower side of the head cushion forms, with a front side of the back rest, the exhaust vent of the ventilation device, said exhaust vent being displaced with respect to the front side of the back rest.

12. The vehicle seat according to claim 11, wherein the diverting mechanism is arranged between supporting bars of said head restraint and forms a U-form that is open toward the back rest in such a way that, in the lowest position of the head restraint, the air channeling element is bordered by the diverting mechanism, and wherein the diverting mechanism is attached to the head cushion by being clipped in place.

13. The vehicle seat according to claim 1, wherein the diverting mechanism is formed from a heat-resistant material.

14. A vehicle seat comprising:
a back rest;
a head restraint which is adjustable in height and which has a head cushion;
a ventilation device having an exhaust vent arranged for venting a warm airflow at an upper side of the back rest; and
a diverting mechanism provided in a lower area of the head restraint and disposed within the head restraint, wherein the warm airflow issuing from the exhaust vent is diverted into at least one of a head and a neck area of a seat passenger via the diverting mechanism wherein the diverting mechanism forms a plastic shell which is attached to the head cushion by being clipped into place, wherein the exhaust vent, on a border strip thereof near to a back side of the back rest, has an air channeling element that projects from an upper side of the back rest and that is aimed toward a front side of the back rest, and wherein the air channeling element, in a lowest position of the head restraint, borders on the diverting mechanism in such a way that an edge which borders on a front side of the diverting mechanism and a lower side of the head cushion forms, with a front side of the back rest, the exhaust vent of the ventilation device, said exhaust vent being displaced with respect to the front side of the back rest.

15. The vehicle seat according to claim 14, wherein the diverting mechanism is arranged between supporting bar of said head restraint and forms a U-form that is open toward the back rest in such a way that, in the lowest position of the head restraint, the air channeling element is bordered by the diverting mechanism, and wherein the diverting mechanism is attached to the head cushion by being clipped in place.

16. The vehicle seat according to claim 15, wherein the diverting mechanism is formed from a heat-resistant material and has a surface that is impermeable to air and that diffusely spreads the warm airflow.

17. A vehicle seat comprising:
a back rest having an upper side;
a head restraint that is attached to the back rest, the head restraint having a head cushion and being movable relative to the back rest to adjust a height of the head cushion relative to the back rest;
a ventilation device having an exhaust vent that vents a warm airflow at the upper side of the back rest; and
a diverting mechanism that is comprised of a different material than the head cushion and that is connected to a lower area of the head restraint but is not part of the head cushion, wherein the entire diverting mechanism is spaced above the upper side of the back rest, wherein the diverting mechanism is operable to divert warm airflow issuing from the exhaust vent into at least one of a head and a neck area of a seat passenger.

18. The vehicle seat according to claim 17, wherein the diverting mechanism lies opposite an opening cross-section of the exhaust vent that lies in an upper surface of the back rest and has an area that covers the opening cross-section and that diverts the issued warm airflow.

19. The vehicle seat according to claim 18, wherein the exhaust vent has an air channeling element that projects from the upper side of the back rest on a border strip of the exhaust vent located in the vicinity of a back side of the back rest, and wherein the air channeling element is aimed toward a front side of a back rest.

20. The vehicle seat according to claim 17, wherein
the diverting mechanism includes a plastic shell which is clipped in place with respect to the head cushion,
the exhaust vent has an air channeling element on a border strip thereof located in the vicinity of a back side of the back rest, wherein
the air channeling element projects from the upper side of the back rest and is aimed toward a front side of the back rest, wherein
the air channeling element borders on the diverting mechanism in a lowest position of the head restraint in such a way that an edge of the air channeling element, which borders on a front side of the diverting mechanism and a lower side of the head cushion, forms, along with the front side of the back rest, the exhaust vent of the ventilation device, and wherein
the exhaust vent is displaced with respect to the front side of the back rest.

21. A vehicle seat comprising:
a back rest,
a head restraint which extends from a top portion of the back rest, which is adjustable in height relative to the back rest, and which has a head cushion;
a ventilation device having an exhaust vent arranged for venting a warm airflow out of an upper side of the back rest to a space between head restraint and the back rest; and a concave diverting mechanism that is attached to a bottom surface of the head restraint, the diverting mechanism being comprised of a different material than the head cushion and being coupled to the head cushion, wherein the diverting mechanism is recessed into a bottom surface of the head cushion and is disposed such that warm airflow issuing from the exhaust vent is diverted into at least one of a head and a neck area of a seat passenger via the diverting mechanism.

* * * * *